(12) United States Patent
Kim et al.

(10) Patent No.: US 10,511,364 B2
(45) Date of Patent: Dec. 17, 2019

(54) METHOD FOR TRANSMITTING SIGNALS IN WIRELESS COMMUNICATION SYSTEM AND APPARATUS THEREFOR

(71) Applicant: LG ELECTRONICS INC., Seoul (KR)

(72) Inventors: Youngtae Kim, Seoul (KR); Hanbyul Seo, Seoul (KR); Kijun Kim, Seoul (KR); Jiwon Kang, Seoul (KR); Seungmin Lee, Seoul (KR); Haewook Park, Seoul (KR); Jonghyun Park, Seoul (KR); Suckchel Yang, Seoul (KR); Hyunsoo Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/318,114

(22) PCT Filed: Aug. 3, 2017

(86) PCT No.: PCT/KR2017/008394
§ 371 (c)(1),
(2) Date: Jan. 15, 2019

(87) PCT Pub. No.: WO2018/026209
PCT Pub. Date: Feb. 8, 2018

(65) Prior Publication Data
US 2019/0305833 A1 Oct. 3, 2019

Related U.S. Application Data

(60) Provisional application No. 62/370,247, filed on Aug. 3, 2016.

(51) Int. Cl.
*H04B 7/02* (2018.01)
*H04B 7/0456* (2017.01)
(Continued)

(52) U.S. Cl.
CPC ......... *H04B 7/0456* (2013.01); *H04L 5/0048* (2013.01); *H04W 88/02* (2013.01); *H04W 88/08* (2013.01)

(58) Field of Classification Search
CPC .... H04B 7/0456; H04L 5/0048; H04W 88/08; H04W 88/02
(Continued)

(56) References Cited

U.S. PATENT DOCUMENTS

2011/0286548 A1 11/2011 Safavi et al.
2012/0106373 A1* 5/2012 Gaal ................ H04L 25/03343
370/252
(Continued)

FOREIGN PATENT DOCUMENTS

WO 2016117974 7/2016

OTHER PUBLICATIONS

PCT International Application No. PCT/KR2017/008394, Written Opinion of the International Searching Authority dated Dec. 7, 2017, 16 pages.
(Continued)

*Primary Examiner* — Don N Vo
(74) *Attorney, Agent, or Firm* — Lee, Hong, Degerman, Kang & Waimey PC

(57) ABSTRACT

The present invention relates to a method for transmitting, by a terminal, a signal in a wireless communication system supporting Multiple Input Multiple Output (MIMO) and an apparatus therefor. Specifically, the method comprises the steps for: generating precoded sounding reference signals (SRS) on the basis of N antenna elements combined with M transceivers (where M and N are natural numbers, M<N); and transmitting, to a base station, information on grouped SRSs among the precoded SRSs, wherein the grouped SRSs
(Continued)

are associated with SRS ports that the terminal can simultaneously transmitted through the M transceivers.

10 Claims, 7 Drawing Sheets

(51) Int. Cl.
  *H04L 5/00* (2006.01)
  *H04W 88/08* (2009.01)
  *H04W 88/02* (2009.01)
(58) Field of Classification Search
  USPC .......................................................... 375/267
  See application file for complete search history.

(56) References Cited

U.S. PATENT DOCUMENTS

| | | | |
|---|---|---|---|
| 2012/0275411 | A1 | 11/2012 | Kim et al. |
| 2014/0112168 | A1 | 4/2014 | Chen et al. |
| 2015/0373730 | A1* | 12/2015 | Fujishiro ............... H04L 1/0003 |
| | | | 455/450 |
| 2016/0262118 | A1* | 9/2016 | Kim .................... H04W 52/365 |
| 2017/0310431 | A1* | 10/2017 | Iyer ........................ H04L 1/1816 |
| 2017/0332359 | A1* | 11/2017 | Tsai ..................... H04B 7/0617 |

OTHER PUBLICATIONS

3rd Generation Partnership Project (3GPP), "Technical Specification Group Radio Access Network; Study on Elevation Beamforming/Full-Dimension (FD) MIMO for LTE (Release 13)," 3GPP TR 36.897 V1.0.1, Jun. 2015, 58 pages.

\* cited by examiner

FIG. 2
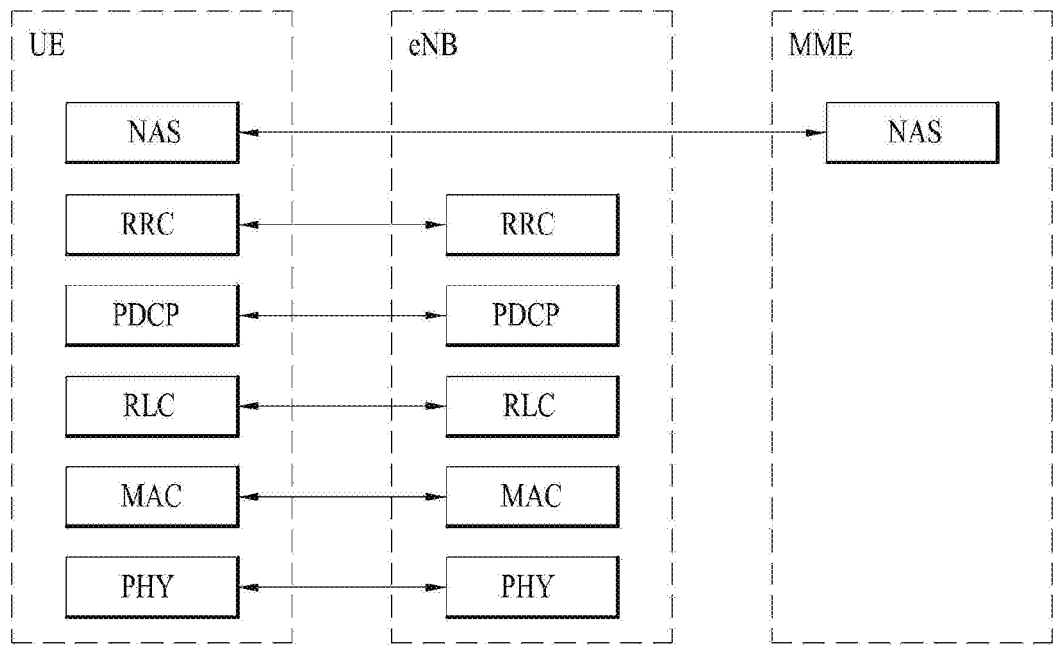
(a) Control plane protocol stack
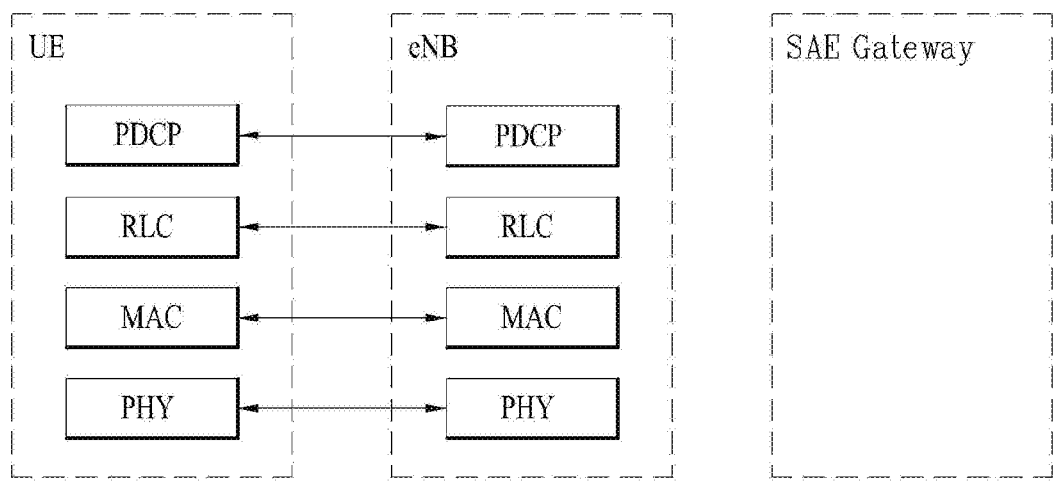
(b) User plane protocol stack

METHOD FOR TRANSMITTING SIGNALS IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2017/008394, filed on Aug. 3, 2017, which claims the benefit of U.S. Provisional Application No. 62/370,247, filed on Aug. 3, 2016, the contents of which are all hereby incorporated by reference herein in their entirety.

TECHNICAL FIELD

The present invention relates to a wireless communication system, and more particularly, to a method of transmitting a signal in a wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.25, 2.5, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Problem

An object of the present invention devised in view of the aforementioned circumstances is to provide a method of transmitting a signal in a wireless communication system and an apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a signal, which is transmitted by a user equipment in a wireless communication system supporting MIMO (Multiple Input Multiple Output), includes the steps of generating precoded SRSs (sounding reference signals) based on the N number of antenna elements coupled with the M number of transceivers (wherein M and N correspond to natural numbers, M<N) and transmitting information on grouped SRSs among the precoded SRSs to a base station. In this case, the grouped SRSs are associated with SRS ports capable of being simultaneously transmitted by the user equipment via the M number of transceivers.

Preferably, the information on the grouped SRSs can be designated in advance according to capability of the user equipment. More preferably, the capability of the user equipment can be defined according to a coupling structure between the M number of transceivers and the N number of antenna elements.

Preferably, the information on the grouped SRSs is indicated by an SRS sequence and the SRS sequence can be specified according to the number of SRS ports capable of being simultaneously transmitted by the user equipment.

Preferably, the method further includes the step of receiving port groups capable of being simultaneously transmitted by the user equipment from the base station.

In this case, the information on the grouped SRSs may correspond to the received port groups. More preferably, the port groups can be indicated by a downlink beam associated with a receive vector of the base station. The method can further include the step of receiving a precoding set for the SRSs from the base station.

Preferably, the information on the grouped SRSs can be configured to be transmitted based on power of a specific value.

Preferably, the information on the grouped SRSs can be transmitted according to a time offset specifically set to the information on the grouped SRSs.

To further achieve these and other advantages and in accordance with the purpose of the present invention, according to a different embodiment, a user equipment transmitting a signal in a wireless communication system supporting MIMO (Multiple Input Multiple Output) includes a radio frequency unit including the N number of antenna elements coupled with the M number of transceivers and a processor, the processor configured to generate precoded SRSs (sounding reference signals) based on the N number of antenna elements coupled with the M number of transceivers (wherein M and N correspond to natural numbers, M<N), the processor configured to transmit information on grouped SRSs among the precoded SRSs to a base station. In this case, the grouped SRSs are associated with SRS ports capable of being simultaneously transmitted by the user equipment via the M number of transceivers.

Advantageous Effects

According to embodiments of the present invention, it is able to efficiently transmit a signal in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 illustrates control plane and user plane structures of a radio interface protocol between a UE and an E-UTRAN on the basis of the 3GPP wireless access network standard.

BEST MODE

Mode for Invention

On the basis of the above description, when an SRS port is configured for a New RAT MIMO technique, the present invention proposes a method of configuring a group, a method of configuring simultaneous transmission to be available in the configured group, and a method of enabling a base station to select a port group.

In a future wireless communication system, a terminal can be managed on a high carrier frequency in a manner of being equipped with many antennas. In order to avoid a coupling loss between basic antennas, in general, spacing of 0.5 lambda ($\lambda$) is necessary. This is because, since a wavelength is considerably shortened on a high carrier frequency, it is able to considerably reduce space between antennas with the help of a shortened lambda.

When the number of antennas of a terminal increases, if an independent transceiver (e.g., RF (Radio Frequency) chain) is installed in each antenna, it may become a considerable burden on the terminal. Hence, discussion on a method of making a single antenna panel, a method of installing a plurality of antennas in a panel, a method of installing transceivers less than the number of antennas in each panel, and a method of installing and managing a phase shifter only between a transceiver and an antenna is in progress.

Figure 1:
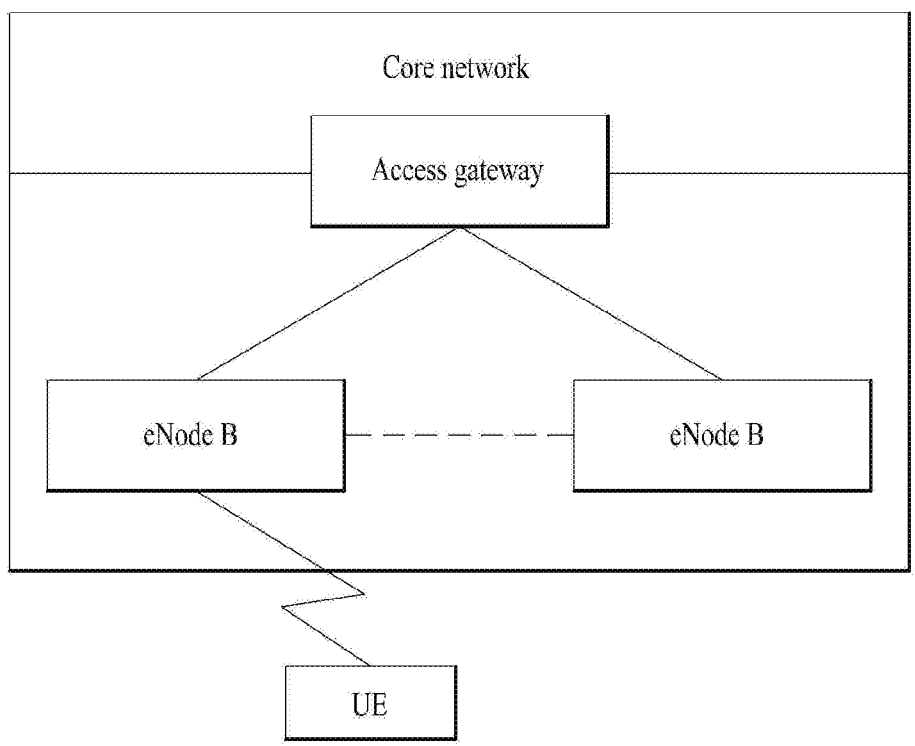
FIG. 1 schematically illustrates an E-UMTS network structure as an example of a wireless communication system.
Figure 3:
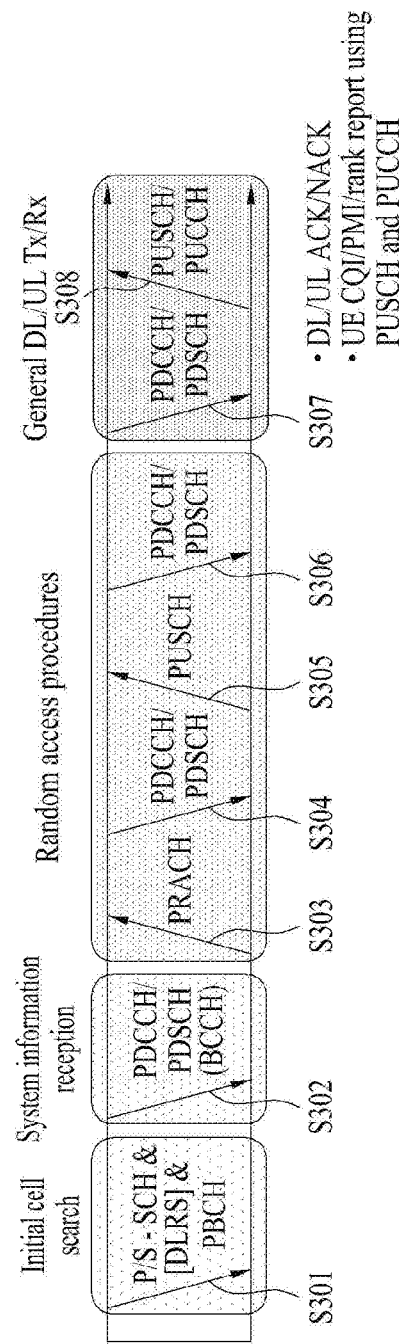
FIG. 3 illustrates physical channels used in a 3GPP system and a general signal transmission method using the same.
Figure 4:
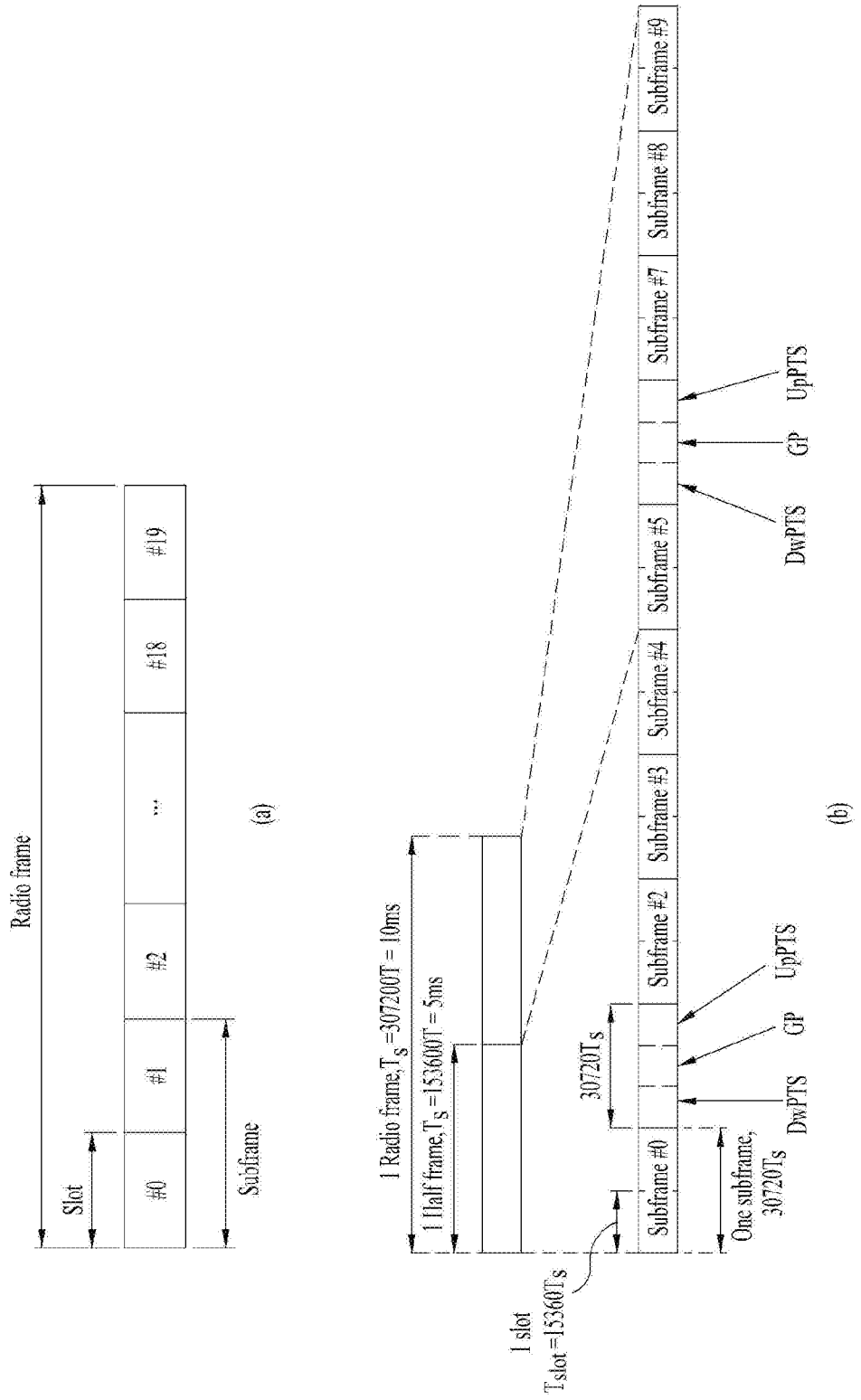
FIG. 4 illustrates a radio frame structure used in LTE.
Figure 5:
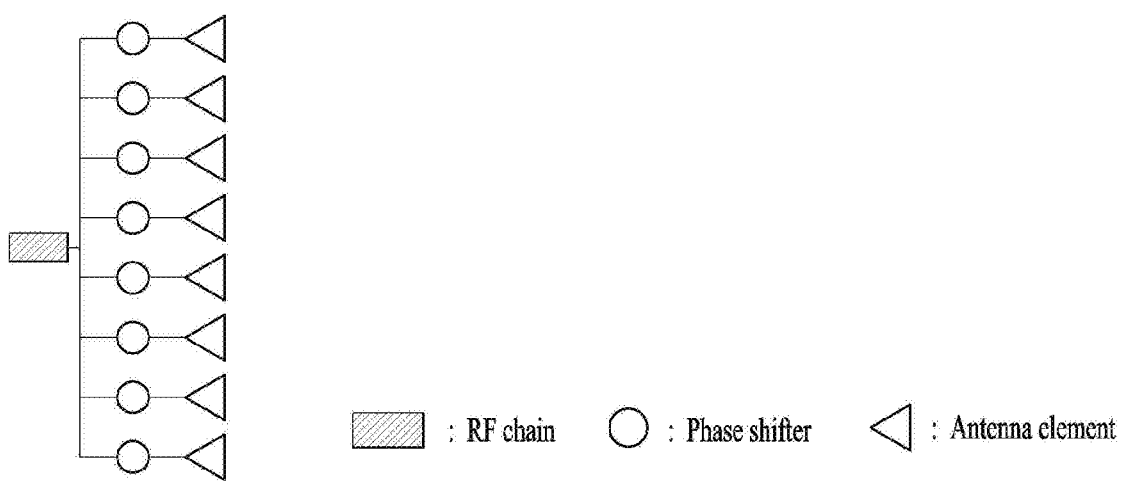
FIG. 5 is a diagram for explaining a coupling structure between an antenna element and a transceiver to which the present invention is applicable.

When the number of transceivers is less than the number of antennas in a panel, a beam direction formed by the panel is limited in a time section. For example, as illustrated in FIG. 5, assume that an antenna panel has 8 antenna elements, there exists one transceiver only, and an antenna is connected with the transceiver via a phase shift. In case of the antennas illustrated in FIG. 5, the number of beam direction formed by 8 antennas corresponds to 1 in a time section. In particular, when frequency signals are generated in the transceiver, although a beam direction is determined by the phase shifter thereafter, only one beam direction is applied to all frequency signals in a time section.

SRS transmission estimates an uplink channel using channel reciprocity between a base station and a UE and can be used for calculating downlink transmission precoding. Or, the SRS transmission can be used for determining uplink precoding based on the uplink channel.

Basically, a base station is able to estimate a channel between the base station and a UE only when an SRS is transmitted in every antenna of the UE. However, when the number of antennas of the UE increases, if an SRS is transmitted in every antenna of the UE, the UE may have a burden in using an uplink resource. Hence, the UE forms a port by applying a weight to all or a part of antenna elements and uses a plurality of ports in transmitting an SRS, thereby increasing resource use efficiency. In this case, the weight can be regarded as SRS transmission precoding of the UE and can be referred to as a precoded SRS.

When a precoded SRS is transmitted, it may be able to form various beam directions depending on precoding. However, as mentioned in the foregoing description, when precoding is performed using a phase shifter, a UE may have beam groups incapable of being transmitted at the same time in a time section. Hence, when a base station estimates a channel using a precoded SRS, the base station can accurately calculate downlink precoding or uplink precoding only when the base station recognizes whether precoded SRS ports correspond to ports capable of performing simultaneous transmission or not. For example, when two precoded SRS ports are unable to perform simultaneous transmission, if the base station fails to recognize it and calculates uplink precoding on the two precoded SRS ports, it may become inappropriate precoding.

In order to solve the problem above, when SRS ports are configured, the present invention proposes a method of configuring a group of ports capable of performing simultaneous transmission and a method of making a base station recognize information on the group consisting of the ports capable of performing simultaneous transmission.

In the following description, when a UE transmits a precoded SRS, assume that the UE transmits the G number of port groups. In this case, each port group is configured by the $N_i$ number of ports. Assume that the UE informs a base station of the number of groups capable of being simultaneously transmitted among the G number of port groups. (Or, the UE may inform the base station of the maximum number of transmission ports capable of being simultaneously transmitted in each port group.)

Embodiment 1

In this case, the number of port groups capable of being simultaneously transmitted can be determined in advance by UE capability. For example, assume that a UE has two transceivers in a panel and each of the transceivers is connected with an antenna element via a phase shifter. In this case, the UE can transmit two beams in a time section with the panel.

In this case, when a plurality of beams are transmitted via SRS port groups, only two port groups can perform simultaneous transmission and it may be able to configure UE capability indicating that the two port groups are able to perform simultaneous transmission only. In this case, a base station is able to recognize the number of SRS port groups capable of performing simultaneous transmission using the UE capability without any additional signaling on each UE. The UE capability can be configured as capability in every specific number. Meanwhile, the capability can also be divided via a range of numbers. In this case, the UE capability can be divided according to a UE category. For example, the UE capability can be divided based on a UE category defined by H/W characteristic, a transmission mode, the number of antenna ports, and the like.

In some cases, a UE may have a structure of switching a panel while sharing a transceiver between panels. In this case, it may set a limit on the number of port groups capable of being simultaneously transmitted by a UE or the maximum number of ports capable of being transmitted within a port group when there are port groups as many as panels. In this case, when an SRS port within a port group transmits many ports, the maximum number of transmission ports within a group capable of being transmitted at a time can be designated as UE capability. The UE capability can be configured as capability in every specific number. Meanwhile, the capability can also be divided via a range of numbers.

The UE capability is divided into several groups based on a structure for a phase shifter connection between a panel and an antenna element or a transceiver switching structure between panels. Each of the groups can be defined as different UE capability. The defined UE capability can estimate a method of configuring a transceiver of a UE in downlink transmission or a method of configuring a structure when a UE performs uplink transmission.

Embodiment 2

In the embodiment 2, a UE feedbacks information on the number of port groups capable of performing simultaneous transmission (or the maximum number of transmission ports capable of performing simultaneous transmission in each port group) to a base station upon the request of the base station. Or, when an SRS is transmitted, the UE can implicitly inform the base station of the information via an SRS sequence.

For example, when the UE implicitly informs the base statin of the information via an SRS sequence, the UE selects an SRS sequence group based on a sequence selection rule and can designate a specific sequence according to the number of port groups capable of being simultaneously transmitted by the UE (or the maximum number of transmission ports capable of being simultaneously transmitted in each port group) in the selected SRS sequence group. In this case, the base station may be aware of the sequence group in advance. The base statin performs blind decoding in the sequence group to determine a used specific sequence. By doing so, the base station can determine the number of port groups capable of being transmitted at the same time by the UE (or the maximum number of transmission ports capable of being transmitted at the same time in each port group).

Embodiment 3

According to the embodiment 3, when a base station calculates downlink or uplink precoding, the base station selects port groups (or the maximum number of transmission ports capable of being transmitted at the same time in each port group) as many as the number of port groups capable of being transmitted by a UE at the same time (or the maximum number of transmission ports capable of being transmitted at the same time in each port group) and can calculate precoding to be applied to the whole of the selected port groups. (Or, the base station can calculate precoding to be applied to the entire ports in consideration of the maximum number of transmission ports capable of being transmitted at the same time in each port group.) In this case, the base station signals the selected port groups to the UE via RRC or a control channel. In the following, for clarity, the embodiment 3 is described in a manner of being restricted to a port group. However, the embodiment 3 can be identically applied to a case that a port is selected from a port group and the selected port is indicated.

First of all, when port groups are selected and signaled, it may signal the port groups by indicating the port groups via an SRS port group transmitted by a UE. In this case, it may signal the port groups by indicating a downlink beam associated with a receive vector corresponding to the SRS port group. 1:1 mapping between the downlink beam and the SRS port group can be performed between the base station and the UE via a precoded RS of the base station.

If it is determined as a channel is rapidly changing due to the high speed of a UE, a base station can explicitly inform the UE of the necessity of cyclic precoding that transmits uplink transmission by changing several precoding with a specific resource unit. In this case, if the number of port groups capable of being simultaneously transmitted by the UE corresponds to g, it is able to transmit the g number of port groups in a time section only. However, it is able to transmit the g number of another port groups in a different time section. In this case, the base statin selects ports groups equal to or greater than the g number of port groups for the UE, calculates precoding on the port groups equal to or less than the g number of port groups in each time section, and can inform the UE of the calculated precoding.

When the base station selects SRS port groups and informs the UE of precoding calculated on the selected SRS port groups, the base station can indicate the precoding using a selection codebook and a precoding codebook.

Although the base station is able to use all of the selected port groups, the base station may select a port again from among the selected port groups and inform the UE of the selected port. In this case, it may inform the UE of a port to be used among the entire ports including the port group rather than select a port group.

The precoding calculated on the selected port groups can be dynamically signaled to UEs together with a rank index and MCS (Modulation and Coding Scheme) via a control channel to make the precoding to be used for uplink transmission. In this case, in order to configure selected ports, a UE configures the ports by applying precoding previously used for precoded SRS transmission to an element. The UE transmits a layer according to the rank index and the MCS received from the base station and precoding between ports.

Embodiment 4

According to the embodiment 4, in order to select a precoding set for a precoded SRS port group, a base station calculates precoding, which forms an SRS port, based on a previously received SRS port and can indicate the precoding to a UE. Or, the UE can directly select the precoding set by calculating precoding via a downlink reference signal. Or, the UE can randomly select the precoding set.

Embodiment 5

According to the embodiment 5, when an SRS port to which precoding is applied is configured, power of each port may vary. However, it may be able to regulate a rule that transmission is to be performed under the assumption of the same power between port groups. In particular, when a port group is selected, a base station can be configured to select the port group under the assumption that port groups have the same power. If a part of power setting is defined in advance between a base station and a UE, it is able to reduce unnecessary signaling.

Embodiment 6

According to the embodiment 6, an SRS port group can be transmitted from a different time resource. In particular, each of SRS port groups may appear with a different time offset or an SRS transmission time pattern at the timing at which SRS transmission starts. i) A base station and a UE may recognize the time offset or the pattern in advance, ii) the base station semi-statically informs the UE of the time offset or the pattern via RRC signaling, or iii) the base station can dynamically inform the UE of the time offset or the pattern via a control channel Since the time offset or the pattern with which a port group is transmitted is recognized between the base station and the UE, the base station can inform the UE of a selected port group via certain offset timing at which the port group is transmitted without a separate port group index.

Although the explanation on the embodiment 6 is restricted to a port group, the embodiment 6 can be identically applied to a case that ports belonging to a port group are transmitted with a time offset or a pattern and the ports are selected and indicated.

The aforementioned embodiments 1 to 6 are described in a manner that port groups are selected by a base station based on the number of port groups capable of being permitted by a UE among the entire port groups. However, UE antennas can be managed in a manner of being divided into several groups depending on implementation of a UE.

For example, assume that UE antennas are divided into two antenna groups and panels belonging to each antenna group include one transceiver only. In this case, a UE can form two port groups at a time using two transceivers. However, when an SRS port group is selected, it may be able to select a port group transmitted from a different antenna group only. In particular, according to the present invention, when SRS port groups are divided, the SRS port groups can be divided into the M number of port groups (the M number of port groups can be comprehended as each antenna group) as big groups. And, it is able to determine the number of SRS port groups capable of being selected from a big group.

In the present invention, although a port group is defined as a port set capable of performing simultaneous transmission, each port group can be managed as a port group capable of transmitting an SRS having a different SRS configuration. In this case, in order to inform a UE of a port group capable of performing simultaneous transmission, a base station can indicate a corresponding SRS configuration to the UE.

Figure 6:
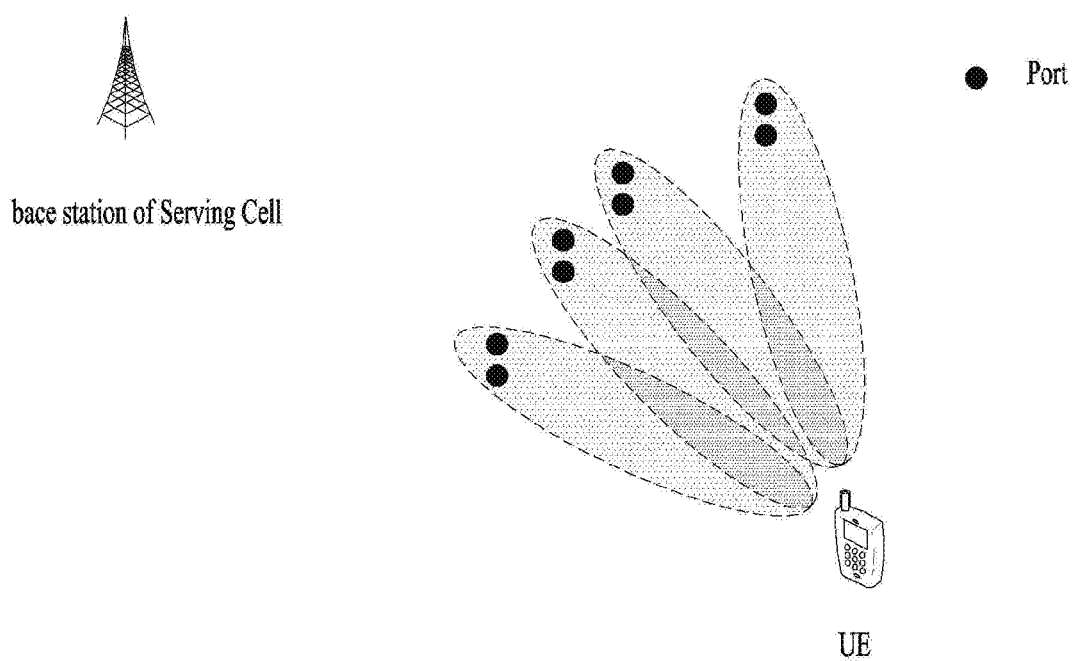
FIG. 6 is a diagram for explaining SRS transmission transmitted to a base station according to one embodiment of the present invention.

It may consider FIG. 6 as an embodiment of the present invention. A base station configures 4 port groups to a UE to make each port group transmit a precoded SRS having two ports. The UE forms 4 beams, which have been calculated via a downlink reference signal, heading towards a base station as an analog beam via an antenna panel. Each analog beam transmits precoded SRS to the base station as many as 2 ports. The base station selects one from among the received precoded SRS port groups, calculates precoding of the selected precoded port group, and makes the UE use the calculated precoding when uplink transmission is performed.

Moreover, although the present invention mainly assumes that an analog beam corresponding to precoding between a transceiver and an antenna element is different depending on an SRS port group, both an analog beam and a digital beam can be applied to a port group or ports.

Figure 7:
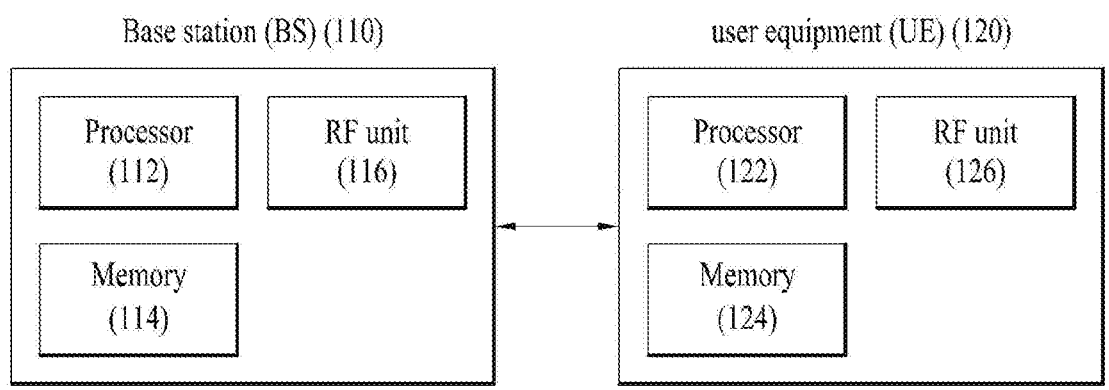
FIG. 7 illustrates a base station and a UE to which the present invention is applicable.

FIG. 7 illustrates a base station (BS) and a UE applicable to an embodiment of the present invention.

When a wireless communication system includes a relay, communication is performed between a BS and the relay on a backhaul link and communication is performed between the relay and a UE on an access link. Accordingly, the BS or UE shown in the figure may be replaced by the relay as necessary.

Referring to FIG. 7, a wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores various types of information related to operations of the processor 112. The RF unit 116 is connected to the processor 112 and transmits and/or receives radio signals. The UE 120 includes a processor 122, a memory 124 and a radio frequency (RF) unit 126. The processor 122 may be configured to implement the procedures and/or methods proposed by the present invention. The memory 124 is connected to the processor 122 and stores various types of information related to operations of the processor 122. The RF unit 126 is connected to the processor 122 and transmits and/or receives radio signals. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term, fixed station, Node B, eNode B (eNB), access point, etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor.

The memory unit may be located at the interior or exterior of the processor and may transmit data to and receive data from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The above-described method and device for transmitting a signal in a wireless communication system can be applied to various wireless communication systems.

What is claimed is:

1. A method of transmitting a signal, which is transmitted by a user equipment in a wireless communication system supporting MIMO (Multiple Input Multiple Output), comprising the steps of:
generating precoded SRSs (sounding reference signals) based on the N number of antenna elements coupled with the M number of transceivers (wherein M and N correspond to natural numbers, M<N); and
transmitting information on grouped SRSs among the precoded SRSs to a base station,
wherein the grouped SRSs are associated with SRS ports capable of being simultaneously transmitted by the user equipment via the M number of transceivers.

2. The method of claim 1, wherein the information on the grouped SRSs is designated in advance according to capability of the user equipment.

3. The method of claim 2, wherein the capability of the user equipment is defined according to a coupling structure between the M number of transceivers and the N number of antenna elements.

4. The method of claim 1, wherein the information on the grouped SRSs is indicated by an SRS sequence and wherein the SRS sequence is specified according to the number of SRS ports capable of being simultaneously transmitted by the user equipment.

5. The method of claim 1, further comprising the step of receiving port groups capable of being simultaneously transmitted by the user equipment from the base station,
wherein the information on the grouped SRSs corresponds to the received port groups.

6. The method of claim 5, wherein the port groups are indicated by a downlink beam associated with a receive vector of the base station.

7. The method of claim 5, further comprising the step of receiving a precoding set for the SRSs from the base station.

8. The method of claim 1, wherein the information on the grouped SRSs is configured to be transmitted based on power of a specific value.

9. The method of claim 1, wherein the information on the grouped SRSs is transmitted according to a time offset specifically set to the information on the grouped SRSs.

10. A user equipment transmitting a signal in a wireless communication system supporting MIMO (Multiple Input Multiple Output), comprising:
a radio frequency unit containing the N number of antenna elements coupled with the M number of transceivers; and
a processor, the processor configured to generate precoded SRSs (sounding reference signals) based on the N number of antenna elements coupled with the M number of transceivers (wherein M and N correspond to natural numbers, M<N), the processor configured to transmit information on grouped SRSs among the precoded SRSs to a base station,
wherein the grouped SRSs are associated with SRS ports capable of being simultaneously transmitted by the user equipment via the M number of transceivers.

* * * * *